US008745221B1

(12) United States Patent
Willbanks

(10) Patent No.: US 8,745,221 B1
(45) Date of Patent: Jun. 3, 2014

(54) DYNAMIC REQUEST REROUTING

(71) Applicant: Limelight Networks, Inc., Tempe, AZ (US)

(72) Inventor: John Willbanks, Gilbert, AZ (US)

(73) Assignee: Limelight Networks, Inc., Tempe, AZ (US)

( * ) Notice: Subject to any disclaimer, the term of this patent is extended or adjusted under 35 U.S.C. 154(b) by 0 days.

(21) Appl. No.: 14/030,862

(22) Filed: Sep. 18, 2013

(51) Int. Cl.
*G06F 15/173* (2006.01)

(52) U.S. Cl.
USPC ............................................. 709/224; 709/223

(58) Field of Classification Search
CPC .................................. H04L 67/1004–67/1027
USPC .................. 709/223–228, 238–244
See application file for complete search history.

(56) References Cited

U.S. PATENT DOCUMENTS

| 7,734,730 | B2 * | 6/2010 | McCanne ...................... 709/219 |
| 8,199,752 | B2 | 6/2012 | Swanson et al. |
| 8,510,807 | B1 * | 8/2013 | Elazary et al. .................... 726/4 |
| 2010/0223364 | A1 * | 9/2010 | Wei ................................. 709/220 |
| 2011/0137973 | A1 * | 6/2011 | Wei et al. ........................ 709/202 |
| 2011/0280143 | A1 | 11/2011 | Li et al. |
| 2011/0314119 | A1 * | 12/2011 | Kakadia et al. ............... 709/213 |
| 2013/0103520 | A1 * | 4/2013 | Lyon ............................ 705/26.1 |
| 2013/0103785 | A1 * | 4/2013 | Lyon ............................ 709/217 |
| 2013/0254333 | A1 * | 9/2013 | Lyon ............................ 709/217 |
| 2013/0254385 | A1 * | 9/2013 | Lyon ............................ 709/224 |

FOREIGN PATENT DOCUMENTS

| EP | 1703693 A1 | 9/2006 |
| WO | 2002095605 A1 | 11/2002 |

OTHER PUBLICATIONS

"Advanced Server Load-Balancing Deployment Guide", Retrieved on Sep. 30, 2013 from http://cisco.com/en/US/solutions/collateral/ns340/ns414/ns742/ns982/sba_dcSvrLoadBal.pdf, Cisco, accessed from the Internet Archive (Wayback Machine) http://archive.org/web/web.php which states that it was available on Dec. 16, 2011.
"Application Request Routing" Retrieved on Sep. 30, 2013 from http://www.iis.net/downloads/microsoft/application-request-routing. Microsoft, accessed from the Internet Archive (Wayback Machine) http://archive.org/web/web.php which states that it was available on Jan. 16, 2013.

(Continued)

*Primary Examiner* — Brendan Higa
(74) *Attorney, Agent, or Firm* — Kilpatrick Townsend & Stockton LLP

(57) ABSTRACT

A point of presence includes edge servers having IP addresses and storing content, a switch/router that receives and forwards requests for content to the edge servers, a health monitoring server that gathers health information from the edge servers, and a dynamic request rerouting (DRR) server. The DRR server is connected with each of the edge servers. If the DRR server obtains a determination that one of the edge servers is down, it advertises a route including the IP address of the down edge server to the switch/router. The switch/router forwards a request for content, originally addressed to the down server, to the DRR server. The DRR server forwards the request to a working server that stores the content. The working server sends the content to the DRR server, the DRR server forwards the content back to the switch/router, and the switch/router responds to the original request with the content.

18 Claims, 10 Drawing Sheets

(56) References Cited

OTHER PUBLICATIONS

"Advanced Load Balancing", Retrieved on Sep. 30, 2013 from http://www.citrix.com/content/dam/citrix/en_us/documents/products-solutions/advanced-load-balancing-8-must-have-features-for-todays-nework-demands.pdf, Citrix, accessed from the Internet Archive (Wayback Machine) http://archive.org/web/web.php which states that it was available on Aug. 16, 2013.

* cited by examiner

DYNAMIC REQUEST REROUTING

BACKGROUND

A content delivery network (CDN) typically includes multiple points of presence (POPs) that work together to serve a requests for content efficiently across a large geographic area or worldwide. Each POP may include multiple content servers (known as "edge servers" herein), and each POP is typically organized such that it continues to function even when one or more of the servers ceases to function properly. However, services provided by CDNs are quite competitive, and users thereof are sensitive to service delays on the order of seconds or fractions thereof.

SUMMARY

In an embodiment, a point of presence for a content delivery network that supports dynamic request rerouting includes a plurality of edge servers that store content objects, each of the edge servers being addressable through an IP address, a switch/router that is operatively configured to receive a request for requested content and forward each such request to an appropriate one of the edge servers, a health monitoring server that gathers health information from each of the edge servers, and a dynamic request rerouting (DRR) server. The DRR server is operatively connected with each of the edge servers, such that upon the DRR server obtaining a status determination that one of the edge servers is not operating properly, the DRR server advertises a route that includes the IP address of the one of the edge servers that is not operating property, to the switch/router. The switch/router forwards an original request for requested content that was originally addressed to the one of the edge servers that is not operating properly, to the DRR server. The DRR server forwards the request to one of the edge servers that is operating properly and stores the requested content. The edge server that is operating properly responds by sending the requested content to the DRR server, the DRR server forwards the requested content back to the switch/router, and the switch/router responds to the original request with the requested content.

In an embodiment, a point of presence for a content delivery network that supports dynamic request rerouting includes a plurality of edge servers that store content objects, each of the edge servers being addressable through an IP address and a switch fabric that is operatively configured to receive content requests and forward each such request to an appropriate one of the edge servers, and when the request names a named one of the edge servers by its IP address, forwards the request to the named one of the edge servers. The point of presence further includes a load balancer that forwards the request to a selected one of the edge servers when the request does not name a named one of the edge servers by its IP address, a health monitoring server that gathers health information from each of the edge servers, and a dynamic request rerouting (DRR) server that receives the health information from the health monitoring server. Upon the DRR server obtaining a status determination that one of the edge servers is not operating properly, the DRR server injects a route that includes the IP address of one of the edge servers that is operating properly, to at least one of the switch fabric and the load balancer, and the at least one of the switch fabric and the load balancer forwards an original request for requested content that was originally addressed to the one of the edge servers that is not operating properly, to the one of the edge servers that is operating properly, using the route injected by the DRR server. The one of the edge servers that is operating properly responds by sending the requested content to the at least one of the load balancer and the switch fabric, and the at least one of the load balancer and the switch fabric responds to the original request with the requested content.

In an embodiment, a method of dynamic request rerouting in a point of presence for content delivery network includes receiving content requests at a switch fabric that operatively couples with a plurality of edge servers of the point of presence, each of the edge servers being associated with an IP address, and forwarding ones of the content requests that do not name a specific edge server's IP address to a load balancer for resolution to a specific edge server. The method further includes accumulating health information for the plurality of edge servers of the point of presence at a health monitoring server, determining from the health information that one of the edge servers is not operating properly, generating substitute route information, by a dynamic request reroute (DRR) server coupled with the health monitoring server, to replace the IP address of the edge server that is not operating properly with an IP address of an edge server that is operating properly and can serve a content request, and injecting the substitute route information from the DRR server to at least one of the switch fabric and the load balancer. The method further includes forwarding an original content request from the at least one of the switch fabric and the load balancer to the one of the plurality of edge servers that is operating properly, utilizing the injected substitute route information, and forwarding content from the one of the plurality of edge servers that is operating properly through the switch fabric to serve the original content request.

in an embodiment, a method of dynamic request rerouting in a point of presence for a content delivery network includes receiving content requests at a switch/router that can be served by a plurality of edge servers of the point of presence, each of the edge servers being associated with an IP address. The method further includes accumulating health information for the plurality of edge servers of the point of presence at a health monitoring server, determining from the health information that one of the edge servers is not operating properly, and advertising, from a dynamic request reroute (DRR) server coupled with the health monitoring server, to the switch/router, a route for the IP address of the server that is not operating properly. The method further includes forwarding a content request addressed to the server that is not operating properly from the switch/router, along the route, to the DRR server, forwarding the content request from the DRR server to one of the plurality of edge servers that is operating properly and can serve the content request, and forwarding content from the one of the plurality of edge servers that is operating properly through the DRR server and the switch/router, to serve the original request.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides exemplary embodiments only, and is not intended to limit the scope, applicability or configuration of the disclosure. Rather, the description will provide those skilled in the art with an enabling description for implementing embodiments. It is understood that various changes may be made in the function and arrangement of elements without departing from the spirit and scope as set forth in the appended claims.

Figure 1:
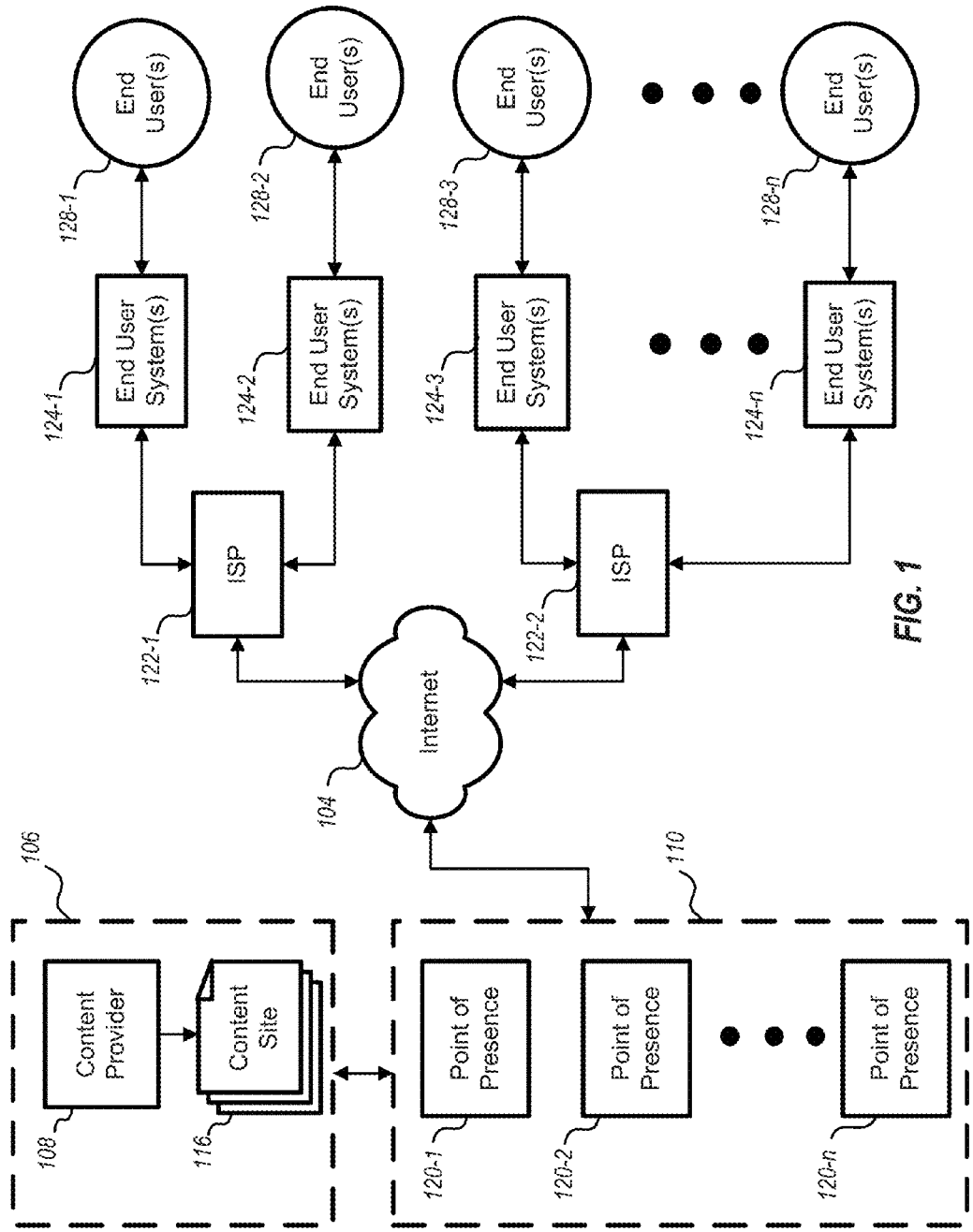
FIG. 1 schematically shows a content delivery network (CDN) configured for delivery of content to multiple end user systems and end users, and an exemplary connection with a content provider system and with users through the Internet, in accord with an embodiment.

FIG. 1 schematically shows a content delivery network (CDN) 110 configured for delivery of content to multiple end user systems 124 and any number of end users 128-(1 through n), and an exemplary connection with a content provider system 106 and with users through the Internet 104 and Internet service providers (ISPs) 122, in accord with an embodiment. Content provider system 106 includes one or more content providers 108 that load files corresponding to content objects onto one or more content sites 116. Content objects are files that are, for example: video files such as raw video footage, movies, commercials; website content; documents; audio files and the like. The content objects may be stored under a variety of file types that are optimized for different purposes, for example certain formats are optimized to minimize memory space while others are optimized for transmission in various modes. CDN 110 includes POPs 120-(1 through n), and interfaces with content provider system 106 to receive the files. The number n of POPs 120 may or may not be the same as the number n of end users 128; n is merely used to indicate that any number of POPs 120 may be present. Similarly, an ISP 122 can serve any number of end user systems. CDN 110 converts copies of the files into such formats as are expected to be requested by end user systems 124, and to spread the copies among POPs 120 as necessary to satisfy demand from end users 128. The end users 128 typically access content by requesting it, through their respective end user systems 124, from a website or streaming service, which relays the request through Internet 104 to CDN 110. However, it will be apparent upon reading and understanding the present disclosure that the techniques herein may be adapted to other systems that distribute content to users.

Figure 2:
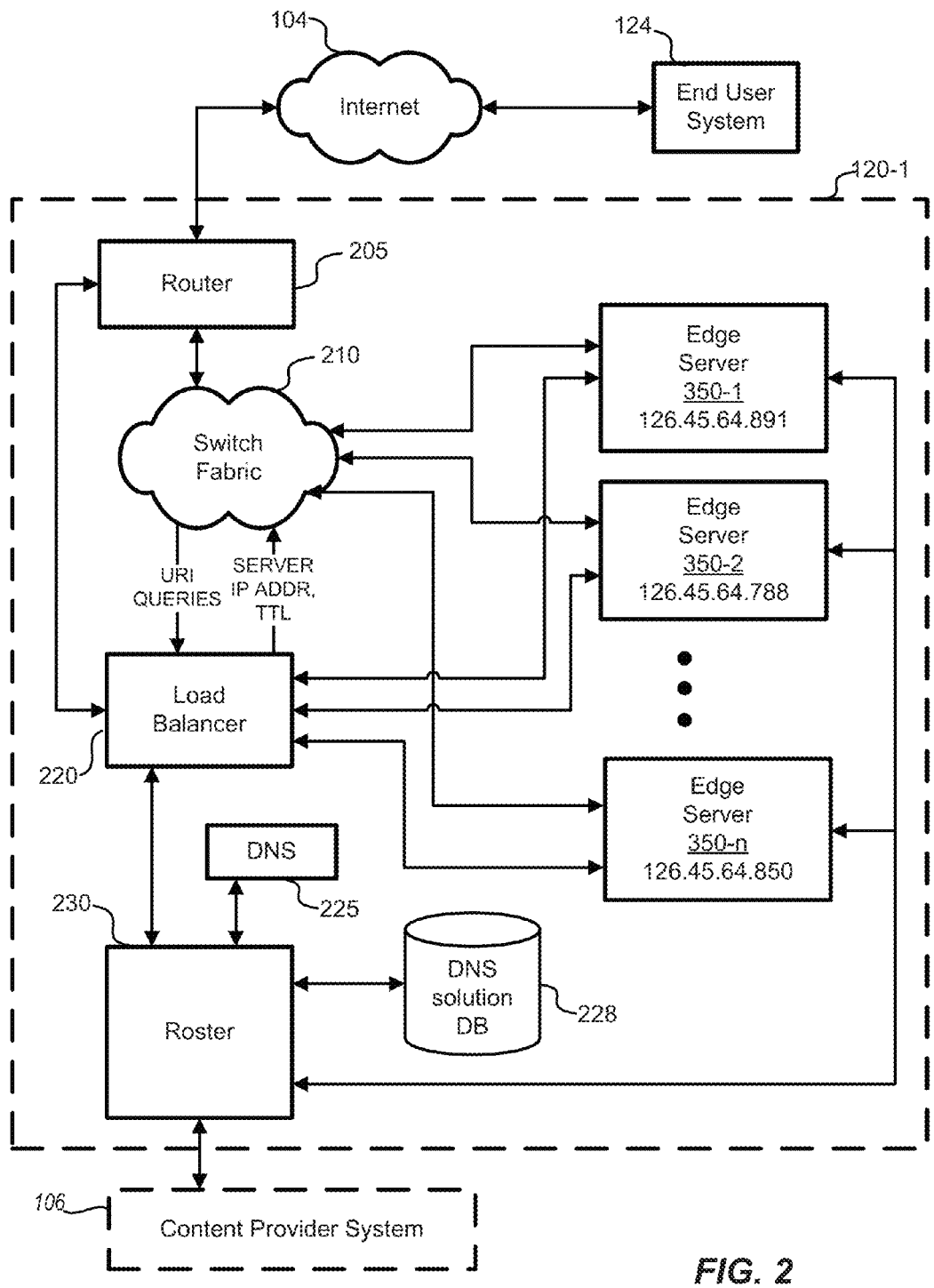
FIG. 2 illustrates certain components within a typical point of presence (POP), in accord with an embodiment.

FIG. 2 illustrates certain components within a typical POP 120-1. POP 120-1 includes a router 205, switch fabric 210, a load balancer function 220, a DNS function 225, a DNS solution database 228, a roster function 230 and multiple edge servers 350. It is understood that the components shown in FIG. 2 are exemplary only; other embodiments of a POP may include other components, or fewer components than those shown. The number n of edge servers 350 may or may not be the same as the number n of POPs 120 and/or end users 128 (FIG. 1); n is merely used to indicate that any number of edge servers 350 may be present. Also, load balancer function 220, DNS function 225, DNS solution database 228 and roster function 230 may be implemented on hardware devices in the configuration shown or in other configurations; in particular, these functions may be implemented within one or more of edge servers 350.

Switch fabric 210 receives requests from Internet 104 for content, usually in the form of a text string called a uniform resource locator (URI) that can for example specify a network location and a particular content object. In one example, requests originate from an application on an end user system 124 that has knowledge of, and can address a request to a specific edge server 350 by, its Internet Protocol (IP) address. For example, a request may explicitly request content from an edge server with IP address 126.45.64.788, identified in FIG. 2 as edge server 350-2 (specific IP addresses herein are exemplary only). In such cases of direct addressing, switch fabric 210 routes the requests directly to the specified edge server, which responds with the requested content.

Alternatively, a URI in a request may not specify an edge server 350 by IP address, but instead include a domain name that must be resolved to a specific IP address for switch fabric 210 to route the request to the correct edge server 350. Such cases of indirect addressing can be content specific, that is, a URI can include not only information of a service that provides the content (e.g., an addressing scheme with domain name such as http//youtube.com), but also information that identifies the content, an applicable codec and/or other information (e.g., a URI such as http://youttube.com/watch?v=bcQwIxRcaYs). Roster 230 for example obtains information about which content objects are on which edge servers 350 directly from the edge servers themselves, or from content provider system 106 that provides the content objects (see also FIG. 1).

When a request includes a domain name instead of a specific IP address, the request passes to DNS function 225. DNS 225 has for example information about which servers of POP 120-1 are designated to serve a given domain name, and may also have information from a roster 230 about which servers of POP 120-1 can serve a given URI request for specific content. Table 1 illustrates how a URI may change as a request propagates through the system of FIG. 2.

TABLE 1

URIs provided to serve an end user request

| Request originating from: | Provides URI of: |
|---|---|
| End User System 124 | http://youtube.com/watch?v=bcQwIxRcaYs |
| DNS 225 | 126.45.64.788/watch?v=bcQwIxRcaYs |
| Roster 230 | 126.45.64.788/mov/foo/bcQwIxRcaYs |

The IP address (sometimes referred to herein as a "DNS solution") is returned with a time-to-live (TTL) indicating how long the address should be considered valid. DNS solutions and their associated TTLs can be cached either by DNS solution database 228 or by a user's system in order to speed up future requests. For example, if an indirectly addressed request for a content object provides a DNS solution, and that solution is cached, a subsequent request (that occurs within the valid TTL) can be served by using the cached solution, which is directly addressed and need not go through the DNS function again. Caching DNS information is not limited to POPs; for example, ISPs can also cache known IP addresses for content, and can substitute a known IF address for a domain name based URI for content, in order to bypass the DNS function. A DNS solution cached by an ISPs is also governed by the TTL associated with the DNS solution.

TTLs are established by interactions between edge servers 350 and roster 230 or between edge servers 350 and load balancer 220. Typical values of TTL for a given edge server 350 to serve a specific URI may range from seconds to many hours or days, although values of a few seconds to 100 seconds are common. DNS 225 provides one or more IP addresses that can serve a given URI, which load balancer 220 chooses among in order to distribute work among edge servers 350. For example, load balancer 220 may allocate requests to specific servers 350 randomly, or according to an algorithm that balances requests among edge servers 350 according to their capacity and over time.

Thus, when any request is directed through Internet 104 to POP 120-1, one of edge servers 350 receives a request through switch fabric 210, either through direct addressing, or indirect addressing that is resolved through DNS 225 and load balancer 220. The addressed edge server 350 responds by providing the requested content object, which is passed back through switch fabric 210 to Internet 104, and delivered to the requesting end user system 124.

A user requesting a content object from POP 120-1 as illustrated in FIG. 2 may experience service degradation if one of the edge servers 350 ceases to operate properly about the time the user sends a request that is routed to POP 120-1, for several reasons. For example, if load balancer 220 (or, for example, ISP) has a TTL for a specific cached IP address, during the TTL, load balancer 220 (or the ISP) does not necessarily recheck health of the edge server. Using the connection of load balancer 220 with edge server 350-1 as an example, during the TTL of a URI that resolves to include IP address 126.45.64.891, load balancer 220 assumes edge server 350-1 is able to serve requests, and sends such requests to 126.45.64.891. If edge server 350-1 ceases to operate properly (sometimes referred to herein as being "down"), load balancer 220 will not discover that fact until a time-out of the request, or the TTL of the URI that resolves to include IP address 126.45.64.891, expires. Upon either of these events occurring, load balancer 220 will remove edge server 350-1 from its list of edge servers 350 that can serve the specific URI, hut load balancer 220 must still work with switch fabric 210 to determine what other servers are up and can serve the specific URI, and to cache the IP address of the replacement edge server 350 in the appropriate locations within load balancer 220, switch fabric 210 and possibly other network locations. This activity takes time, during which a request for the specific URI must wait. For example, if edge server 350-2 is up and can serve the URI, the original request waits while edge server 350-2 is identified, for the IP address of edge server 350-2 to be cached as necessary and for the request to be repeated to edge server 350-2.

In the above example, when edge server 350-1 goes down, a time delay experienced by a user while the TTL of edge server 350-1 expires and while the network configures edge server 350-2 to handle a request can easily run to seconds or more. It should also be noted that the configuration of POP 120-1 requires up to six network "hops" from and back to Internet 104, to serve a given request: from Internet 104 to switch fabric 210; from switch fabric 210 to load balancer 220; from load balancer 220 to an edge server 350; and back to Internet 104 through the same components (a directly addressed request that does not need to travel through load balancer 220 would only require four "hops").

Figure 3:
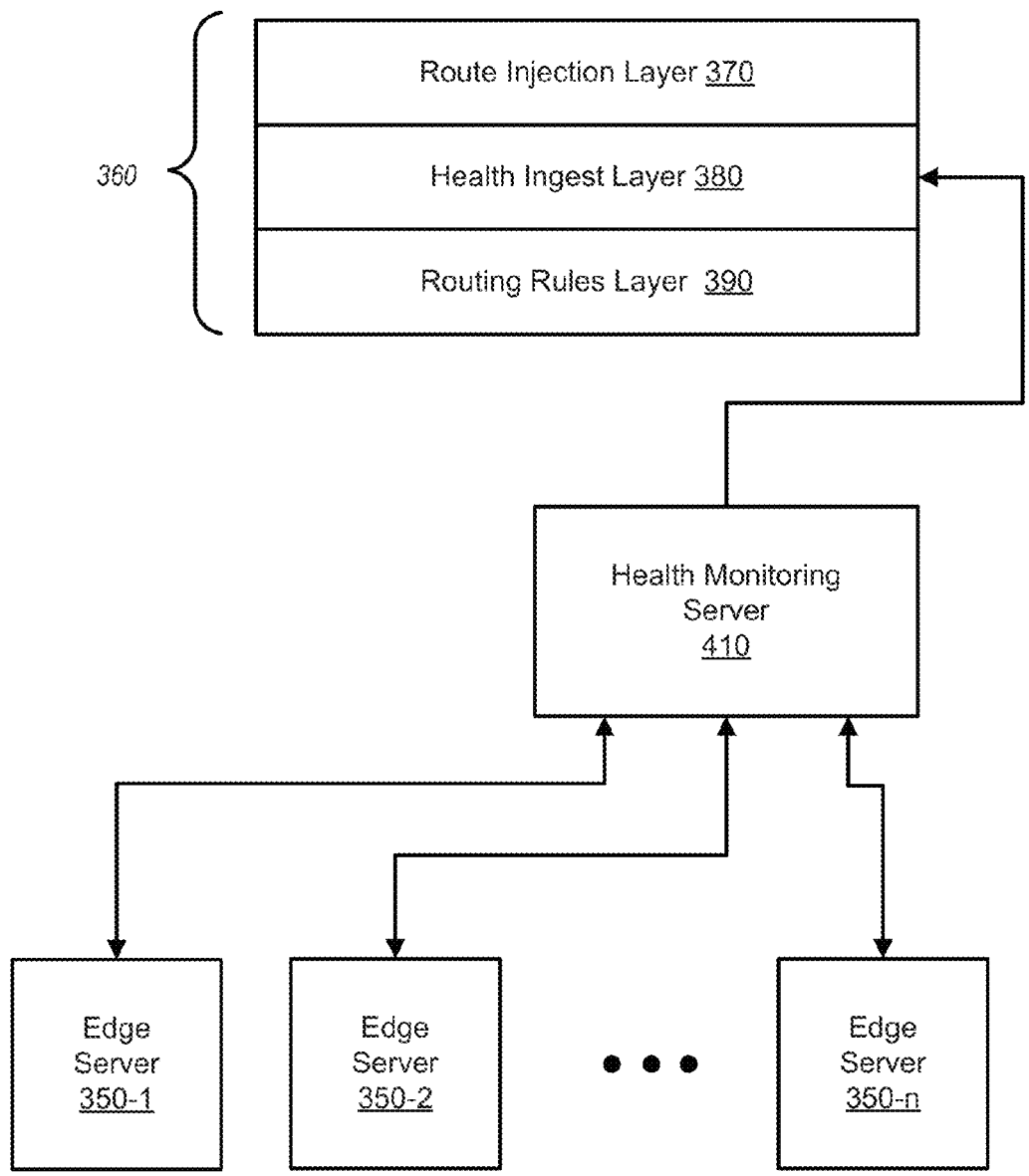
FIG. 3 illustrates a dynamic request rerouting (DRR) server and a health monitoring server, in accord with an embodiment.

FIG. 3 illustrates a dynamic request rerouting (DRR) server 360 and a health monitoring server 410, in accord with an embodiment. Although the term "DRR server" is used throughout, it should be understood that a DRR server may be a standalone piece of hardware or a function implemented on other hardware of a POP, such as an edge server 350. DRR server 360 includes a route injection layer 370, a health ingest layer 380 and a routing rules layer 390. DRR server 360 works with health monitoring server 410 to proactively assess the health of edge servers 350 and to reroute requests therefrom appropriately to minimize delays in service that would otherwise result when an edge server 350 goes down. DRR server 360 and health monitoring server 410 can detect an edge server malfunction and can reconfigure a POP to work around the malfunction nearly in real time, and much faster than POP 120-1 shown in FIG. 2. It should also be noted that the embodiments now described can reconfigure a POP for content delivery much faster than, for example, a human monitoring and reacting to status of edge servers.

Health ingest layer 380 of DRR server 360 continuously receives at least health information for edge servers 350 from the health monitoring server 410, for use in proactively steering content traffic away from edge servers 350 that are determined not to be operating properly. Health monitoring server 410 may make a status determination and forward the status determination to health ingest layer 380, or may simply gather health information and forward the information to health ingest layer 380. Health monitoring server 410 receives information from edge servers 350 for example through HTTP, and sends either the health information itself or status determinations based on the health information, to health ingest layer 380 using a transport or messaging protocol such as, but not limited to, HTTP, rsync, syslog, rabbitmq or the like. Status determinations are made in any desired manner; for example, by receiving and interpreting native status or health check information that may be available from edge servers 350, or by monitoring content requests made to edge servers 350, and responses thereto, and determining that the responses are met in a timely manner. When health information is forwarded to health ingest layer 380 without a health determination, health ingest layer 380 makes the status determination from the health information and forwards the status determination to routing rules layer 390.

Routing rules layer 390 generates recommendations for substitutions of edge servers, utilizing status determinations of all edge servers 350 within a POP to make best use of the existing healthy server capacity of the POP. For example, routing rules layer 390 utilizes knowledge of IP addresses and content typically served by the various edge servers 350 to generate substitute IP addresses to reroute traffic originally targeted to an edge server 350 that is down, to another edge server 350. Route injection layer 370 implements the rerouting determined by routing rules layer 390.

Figure 4:
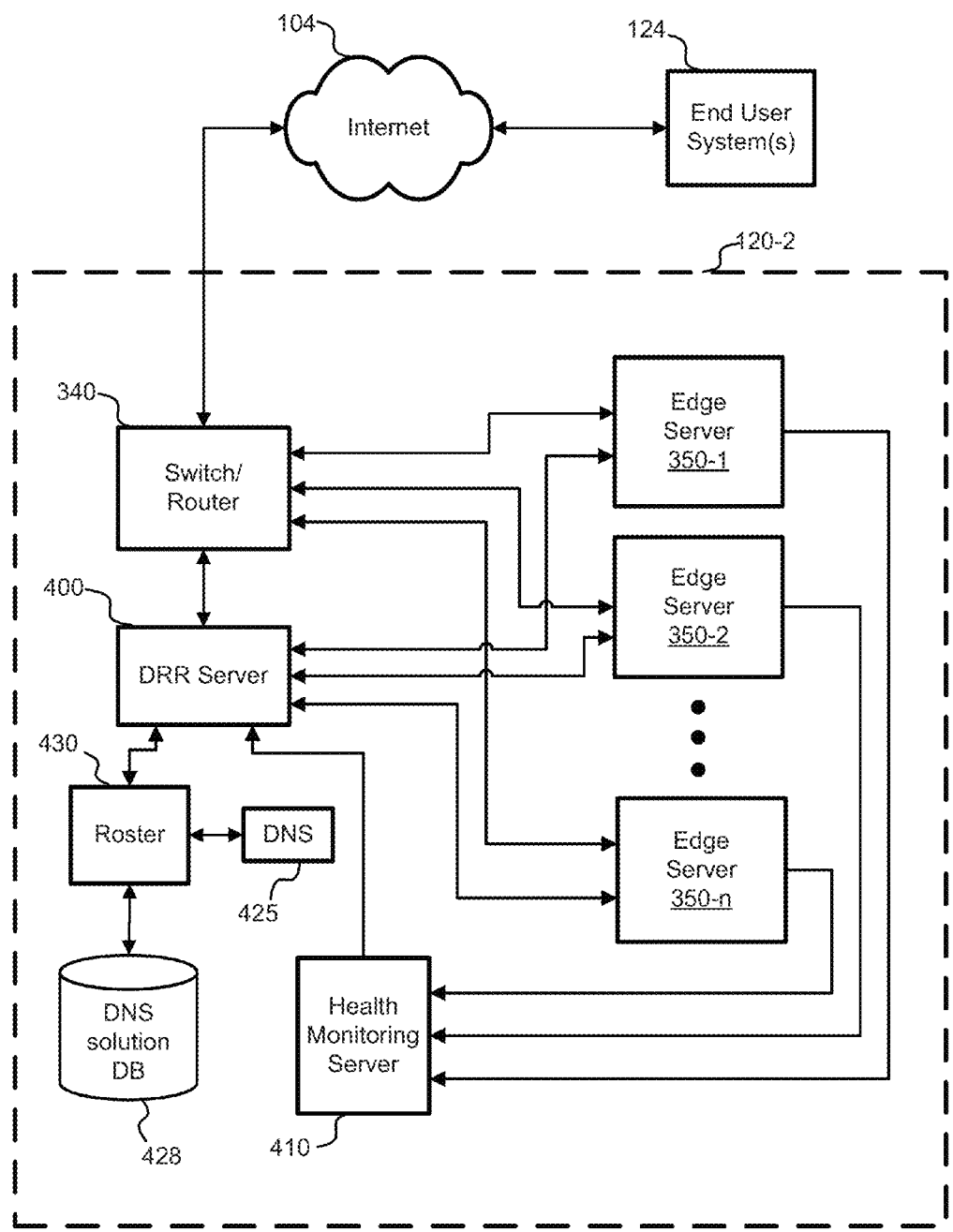
FIG. 4 illustrates the DRR server and health monitoring server of FIG. 3 integrated with a switch/router and edge servers in a point of presence (POP), in accord with an embodiment.

FIG. 4 illustrates a DRR server 400 and health monitoring server 410 integrated with a switch/router 340, a roster 430, a DNS function 425, a DNS solution database 428 and edge servers 350, in a POP 120-2, DRR server 400 is an example of DRR server 360, FIG. 3, and roster 430, DNS function 425 and DNS solution database 428 function in the same manner as roster 230, DNS function 225 and DNS solution database 228, FIG. 2. In use, switch/router 340 forwards content requests from Internet 104 to appropriate edge servers 350 and relays the responses therefrom back to Internet 104. Health monitoring server 410 monitors health of the edge servers 350 and enables DRR server 400 to rapidly reconfigure POP 120-2 to reroute content requests in the event any one of edge servers 350 goes down. The rerouting implements a full proxy mode of operation, wherein traffic originally destined for the down server is instead routed through DRR server 400, as now discussed.

Figure 5A:
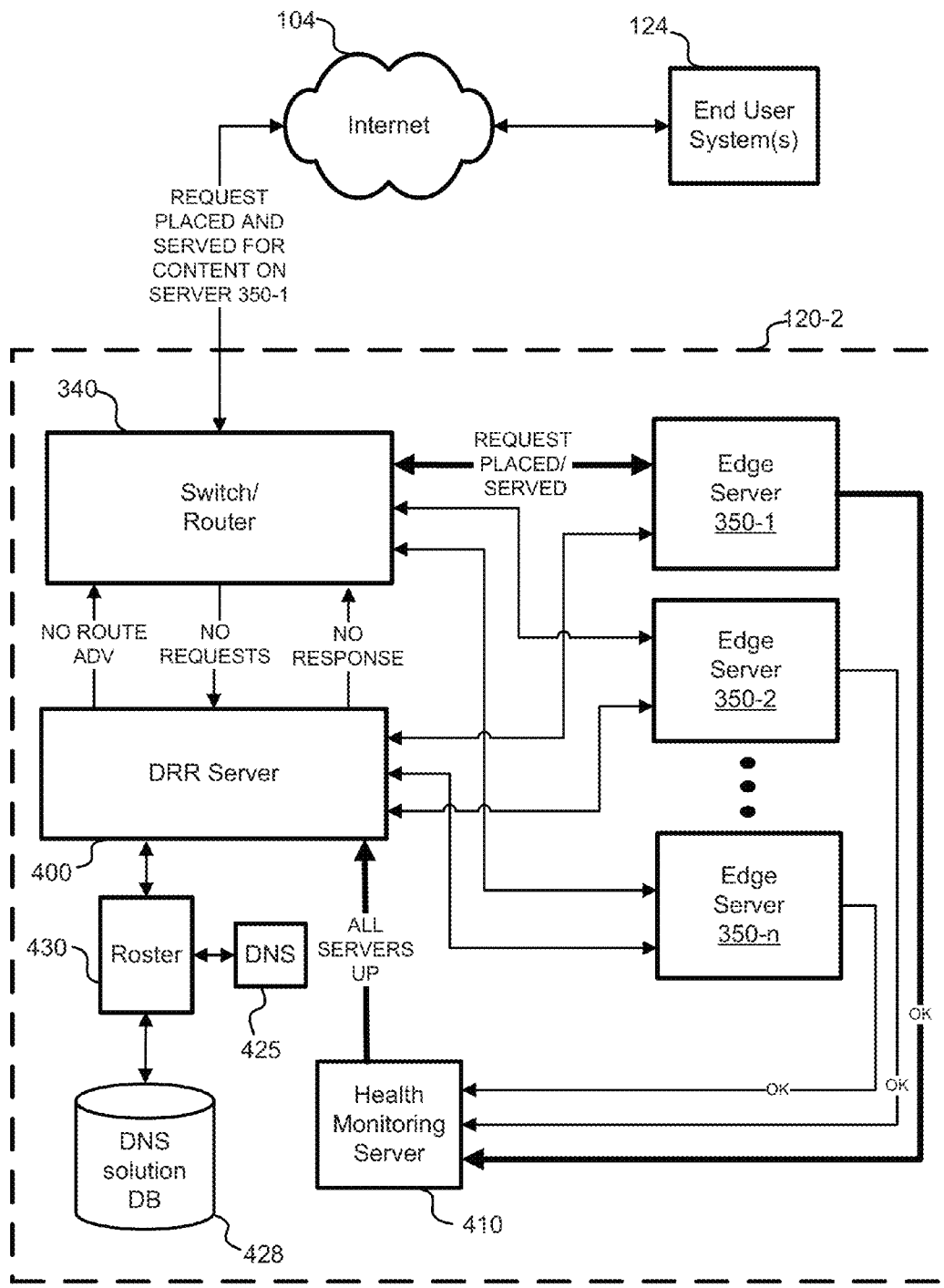
FIG. 5A illustrates normal mode operation of the POP of FIG. 4, when all edge servers 350 therein are operating properly, in accord with an embodiment.

FIG. 5A illustrates normal mode operation of POP 120-2, that is, operation of POP 120-2 when all edge servers 350 therein are operating properly. FIG. 5A illustrates key information transfers internal to POP 120-2 with heavy arrows. In the example of FIG. 5A, Internet 104 places a request for content that can be sourced from edge server 350-1, to switch/router 340. All edge servers 350 provide health information to health monitoring server 410; since in this example all edge servers 350 are operating normally, ail of the information transmitted by the servers are shown as "OK" (it is understood that "OK" is not a status determination, but stands for health information that is consistent with each edge server 350 operating properly). Health monitoring server 410 returns a status determination to DRR server 400 that all edge servers are up. DRR server 400 does not advertise any alternate routing, receives no requests and responds to no requests. Switch/router 340 places a request for content with edge server 350-1, which serves the request. The content is relayed by switch/router 340 back to Internet 104 for the requesting end user system 124. It may be noted that the example illustrated in FIG. 5A only requires four network "hops" from and back to Internet 104, to serve a given request: from Internet 104 to switch/router 340; from switch/router 340 to edge server 350-1; and back to Internet 104 through the same components. Thus, POP 120-2 may serve content more efficiently when operating in the normal mode, than POP 120-1 (FIG. 2).

Figure 5B:
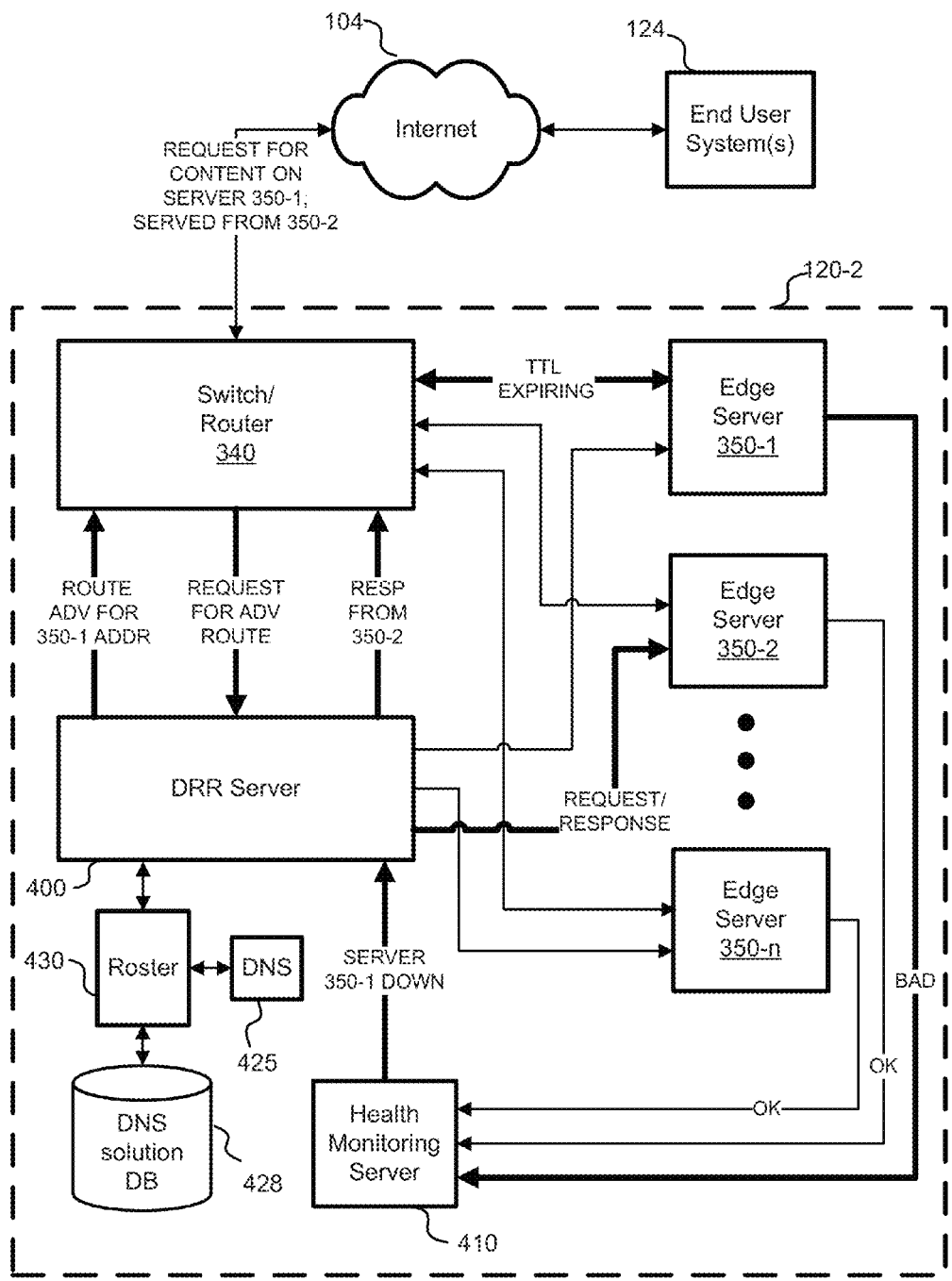
FIG. 5B illustrates operation of the POP of FIG. 4 when a particular one of the edge servers has failed, and a request for content therein is rerouted in frill proxy mode, in accord with an embodiment.

FIG. 5B illustrates operation of POP 120-2 when edge server 350-1 has failed and a request for content therein is rerouted in full proxy mode. FIG. 5B illustrates key information transfers within POP 120-2 with heavy arrows. In the example of FIG. 5B, Internet 104 places a request for content that can be sourced from edge server 350-1, to switch/router 340. Edge server 350-1 is not operating properly, so transmits health information shown as "BAD" (like the previous "OK," "BAD" is not a status determination, but stands for information that is consistent with edge server 350-1 not operating properly in at least some respect). Health monitoring server 410 returns a status determination to DRR server 400 that edge server 350-1 is down. DRR server 400 places a route advertisement to switch/router 340 advertising the IP address of edge server 350-1, and thus receives the content request that was originally addressed to edge server 350-1. The request could also be placed to edge server 350-1 parallel, but any response therefrom may be ignored. Also, it may be noted that the TTL of edge server 350-1 will expire because edge server 350-1 is not operating properly. Similarly, if an IP address of content on edge server 350-1 had been cached by an ISP (not shown in FIG. 59; see FIG. 1) its TTL expire also, but requests made during such TTL will be rerouted by switch/router 340 because of the route advertisement placed by DRR server 400. DRR server 400 has knowledge that edge server 350-2 can serve the original content request, forwards the content request to edge server 350-2, and receives the requested content in response. DRR server 400 forwards the response from edge server 350-2 to switch/router 340. The requested content is relayed by switch/router 340 back to Internet 104 for the requesting end user system 124. It should be noted that the configuration shown in FIG. 5B requires six network "hops" from and back to Internet 104, to serve a given request: from Internet 104 to switch/router 340; from switch/router 340 to DRR server 400; from DRR server 400 to edge server 350-2; and back to Internet 104 through the same components. Thus, if measured by network "hops" to process a content request, efficiency of POP 120-2 may be improved when operating in the normal mode, but even if compromised by edge server 350-11 going down, the efficiency of POP 120-2 only degrades to about the efficiency of POP 120-1.

Figure 6:
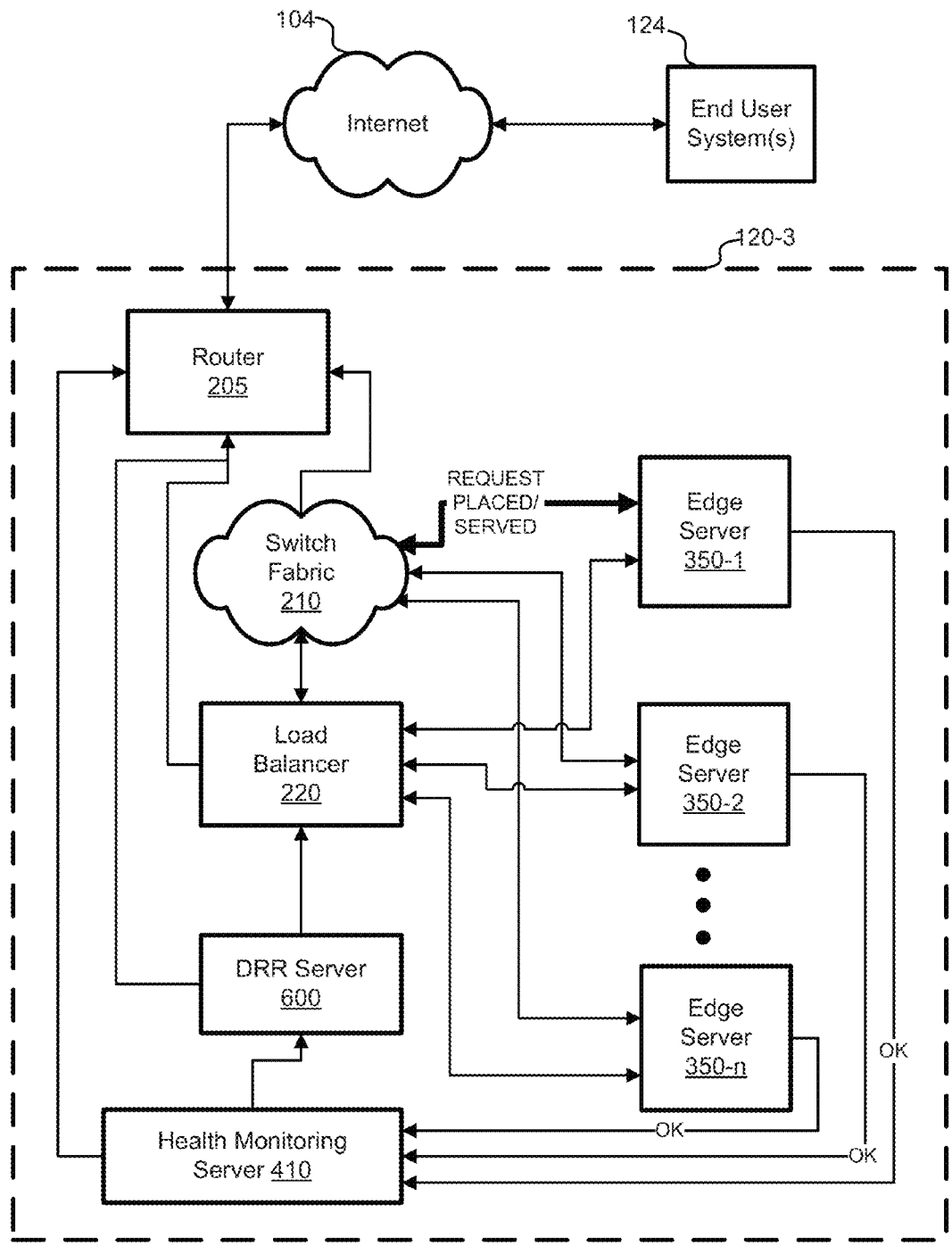
FIG. 6 illustrates a DRR server and a health monitoring server integrated with a switch fabric, a load balancer and edge seers in a POP, in accord with an embodiment.

FIG. 6 illustrates another DRR server 600 integrated with health monitoring server 410, router 205, switch fabric 2110, load balancer 220 and edge servers 350 in a POP 120-3. DRR server 600 is another example of DRR server 360, FIG. 3. In use, when all edge servers 350 are up, POP 120-3 operates much like POP 120-1; an example transaction is illustrated in FIG. 6. FIG. 6 illustrates key information transfers within POP 120-3 with heavy arrows. In the illustrated example, switch fabric 210 receives a request from Internet 104 that originates from an application on an end user system 124 that can address requests to specific edge servers 350 by their IP addresses. In this case, switch fabric 210 receives and routes a request directly to specified edge server 350-1, which responds with the requested content.

In another example of operation of POP 120-3, similar to the operation of POP 120-1, FIG. 2, a URI may not specify an edge server by IP address. In this example, switch fabric 210 may add information corresponding to an understanding of which edge servers 350 can serve a given request, and IP addresses of those servers. This information is passed on to load balancer 220 that allocates such requests to specific servers 350 either randomly, or according to an algorithm that balances requests among edge servers 350 according to their capacity and over time. A selected one of edge servers 350 receives a request from load balancer 220 and responds by providing the requested content object; load balancer 220 passes the content object back through switch fabric 210 to Internet 104, which delivers it to the requesting end user system 124.

In POP 120-3, as in POP 120-2, health monitoring server 410 determines health of edge servers 350. However, unlike DRR server 400 in POP 120-2, in the event of an edge server ceasing to operate properly, DRR server 600 does not receive traffic directly as a proxy host, but provides rerouting information to switch fabric 210 and/or load balancer 220 to reroute their requests to working edge servers 350.

Figure 7:
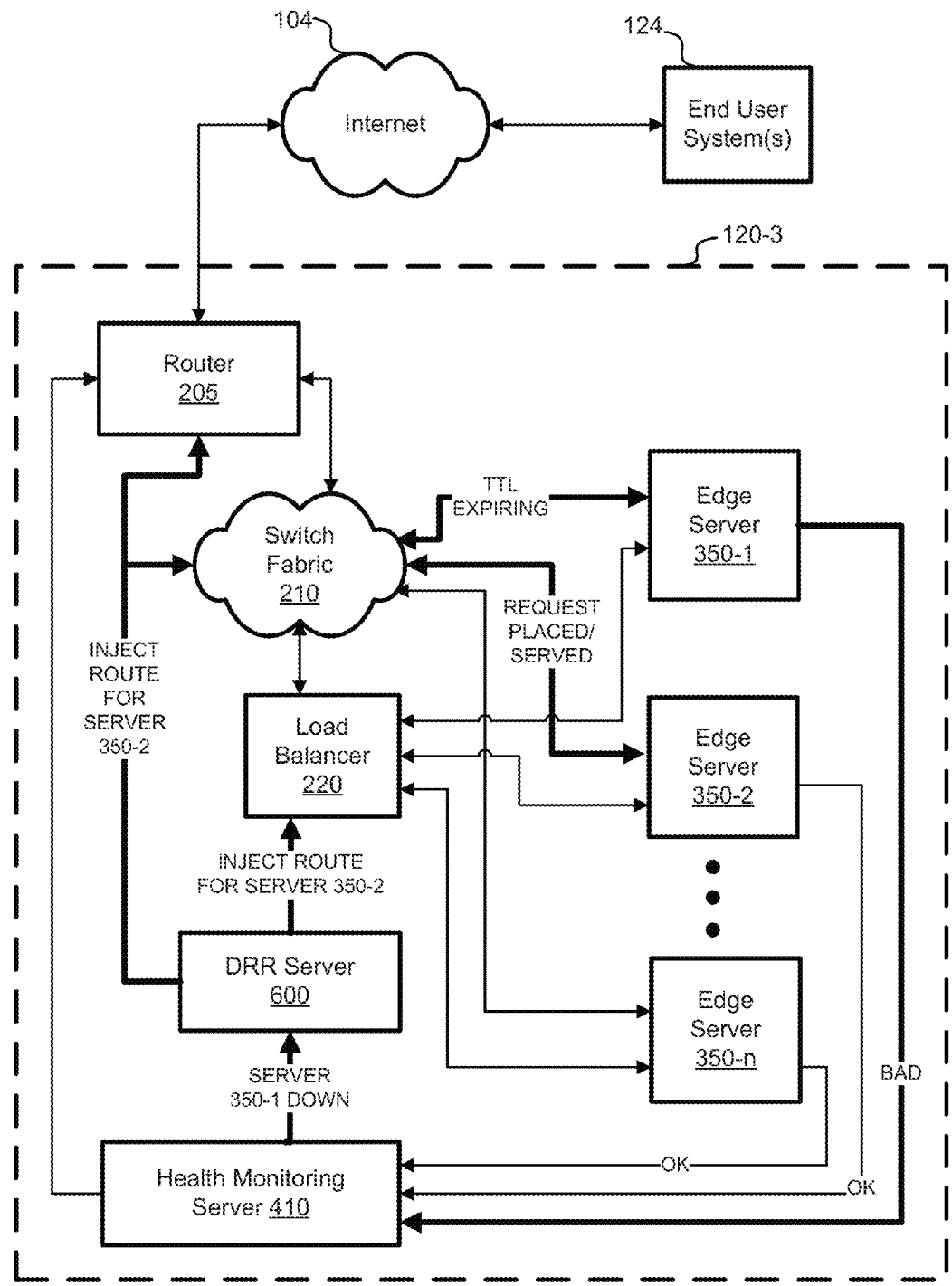
FIG. 7 illustrates key information transfers within a POP, in accord with an embodiment.

An example of such rerouting is illustrated in FIG. 7. FIG. 7 illustrates key information transfers within POP 120-3 with heavy arrows. An end user system 124, through an ISP (not shown) and Internet 104, places a request for content that can be sourced from edge server 350-1, to POP 120-3. Router 205 receives the request. Edge server 350-1 is not operating properly, so transmits health information shown as "BAD." The TTL of edge server 350-1 will expire (wherever it exists, e.g., in switch fabric 210, router 205 and/or an ISP cache) because edge server 350-1 is not operating properly. Health monitoring server 410 returns a status determination to DRR server 600 that edge server 350-1 is down. DRR server 600 knows that edge server 350-2 can serve the original content request, and injects a route for edge server 350-2 to switch fabric 210, load balancer 220 and/or router 205. In embodiments, router 205 can change a request originally designating the IP address of edge server 350-1 to designate the IP address of edge server 350-2, or can forward the request to switch fabric 210, which switches the request to edge server 350-2. Alternatively, load balancer 220 may also use the information from DRR server 600 to tell switch fabric 210 to route requests for content on edge server 350-1 to edge server 350-2. After receiving the content request in any of these ways, edge server 350-2 serves the request; the content is sent back through switch fabric 210 to Internet 104 for the requesting end user system 124.

Because the health checks and rerouting performed by health monitoring server 410 and DRR servers 360, 400, 600 are proactive, requests destined for an edge server 350 that goes down can be rerouted to operating servers much faster than in the case of a TTL based POP architecture such as POP 120-1 illustrated in FIG. 2 (and much faster than human intervention). For example, time required for detection and reconfiguration to implement a path to a working edge server after another edge server goes down may be five seconds or less, and usually less than one second. In such a case, the time required for detection and reconfiguration to implement a path to a working edge server after another edge server goes down may be less than the TTL of the server that went down, let alone the time required to re-establish routes with IP addresses of working servers. Further, the use of health monitoring server 410 and DRR, servers 360, 400, 600 result in fewer network "hops" to serve content when the network is healthy, further streamlining POP operation. Still further, even if TTL based network connections are kept in place between switch/router 340 and each of edge servers 350, the overhead activity of maintaining the network connections may also be streamlined by extending the TTL periods to very long periods (e.g., many minutes or hours) because at least part of the function of ensuring network connectivity is largely replaced by the activities of health monitoring server 410 and DRR servers 360, 400, 600.

In embodiments, it is possible to have an edge server 350 substitute its address for another edge server's address without involvement of router 205 and/or switch fabric 210. For example, if only layer 2 mac addressing is used at the server level, edge servers themselves (under the direction of DRR server 600) can use gratuitous arps to take over a mac address of a down server. In this example, if edge server 350-1 goes down, and DRR, server recognizes that edge server 350-2 should take on traffic that had been addressed to edge server 350-1, edge server 350-2 can issue a gratuitous arp (that is, an arp reply that is spontaneous, not in response to an arp request) to tell switch fabric 210 that it is now master of edge server 350-1's mac address. When a subsequent request designating edge server 350-1 comes to switch fabric 210, it is simply routed to the mac address of edge server 350-1, and thus arrives at edge server 350-2. A subsequent gratuitous arp can be issued by edge server 350-1 to regain control of its own mac address when edge server 350-1 comes back up.

Figure 8:
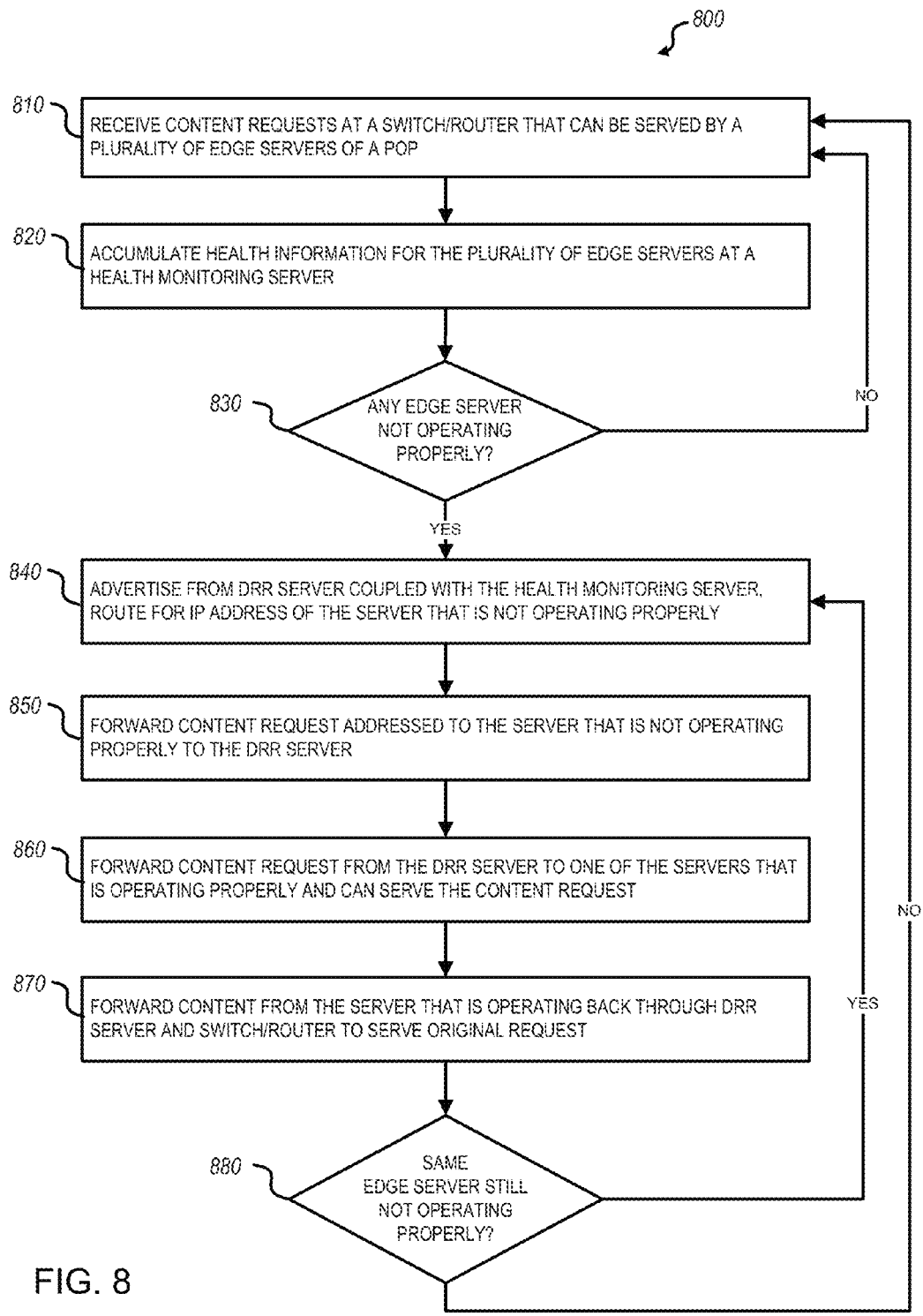
FIG. 8 is a flowchart of a method of dynamic request rerouting in a point of presence (POP) of a content delivery network, in accord with an embodiment.

FIG. 8 is a flowchart of a method 800 of dynamic request rerouting in a point of presence (POP) of a content delivery network. Method 800 operates on a POP that includes a dynamic request reroute (DRR) server 400 as discussed above in connection with FIGS. 4, 5A and 5B. Step 810 receives content requests at a switch/router that can be served by a plurality of edge servers of the POP. Each of the edge servers is associated with an IP address. An example of step 810 is switch/router 340 within POP 120-2 receiving a content request from end user system 124. FIG. 4. Step 820 accumulates health information for the plurality of edge servers at a health monitoring server. An example of step 820 is health monitoring server 410 receiving health information from each of edge servers 350-1, 350-2, 350-n, FIG. 4. Step 820 may be performed on an ongoing basis while content requests are being served, that is, it may be performed concurrently with step 810 and other steps of method 800.

Step 830 is a decision step that determines whether any of the edge servers are not operating properly. One example of step 830 is health monitoring server 410 making a determination that all edge servers 350-1, 350-2, . . . 350-n are operating properly, FIG. 5A. Another example of step 830 is health monitoring server 410 making a determination that edge server 350-1 is not operating properly, FIG. 5B. Also, as discussed above, the determination that all edge servers are operating properly or that one of them is operating improperly could be made by the DRR server based on information accumulated by health monitoring server 410, FIG. 4. If all of the edge servers are found to be operating property, method 800 reverts to step 810 (and 820 in parallel) to continue serving content requests. If any of the edge servers are found not to be operating properly, method 800 branches to step 840 that advertises, from the DRR server coupled with the health monitoring server, to the switch/router, a route for the IP address of the server that is not operating properly. An example of step 840 is DRR server 400 advertising a route with the IP address of edge server 350-1 to switch/router 340, FIG. 5B. In step 850, the switch/router forwards a content request that was originally addressed to the server that is not operating properly, to the DRR server, in response to the route advertisement in step 840. An example of step 850 is switch/router 340 forwarding a content request that was originally addressed to edge server 350-1 to DRR server 400, FIG. 5B. In step 860, the DRR server forwards the content request received in step 850, to a different one of the plurality of servers, one that is both operating properly and can serve the content request. An example of step 860 is DRR server 400 forwarding the content request to edge server 350-2, FIG. 5B. In step 870, the server that is operating supplies content in response to the request, which is then forwarded back through the DRR server and the switch/router to serve the original request. An example of step 870 is edge server 350-2 supplying content in response to the original content request back to DRR server 400, and DRR server 400 forwarding the content to switch/router 340, FIG. 5B. Step 880 is a decision step that determines whether the same edge server found not to be operating properly in step 830, is now operating properly. An example of step 880 is health monitoring server 410 making a determination that all edge servers 350-1, 350-2, . . . 350-n are now operating properly, FIG. 5A. Step 880 is optional, in the sense that it essentially repeats the determination made in step 830, so that content requests directed to the server that is not operating properly are rerouted continually while the server is down. Once the server that was not operating properly returns to normal operation, step 880 (or step 830) returns method 800 to step 810 to continue receiving content requests.

Figure 9:
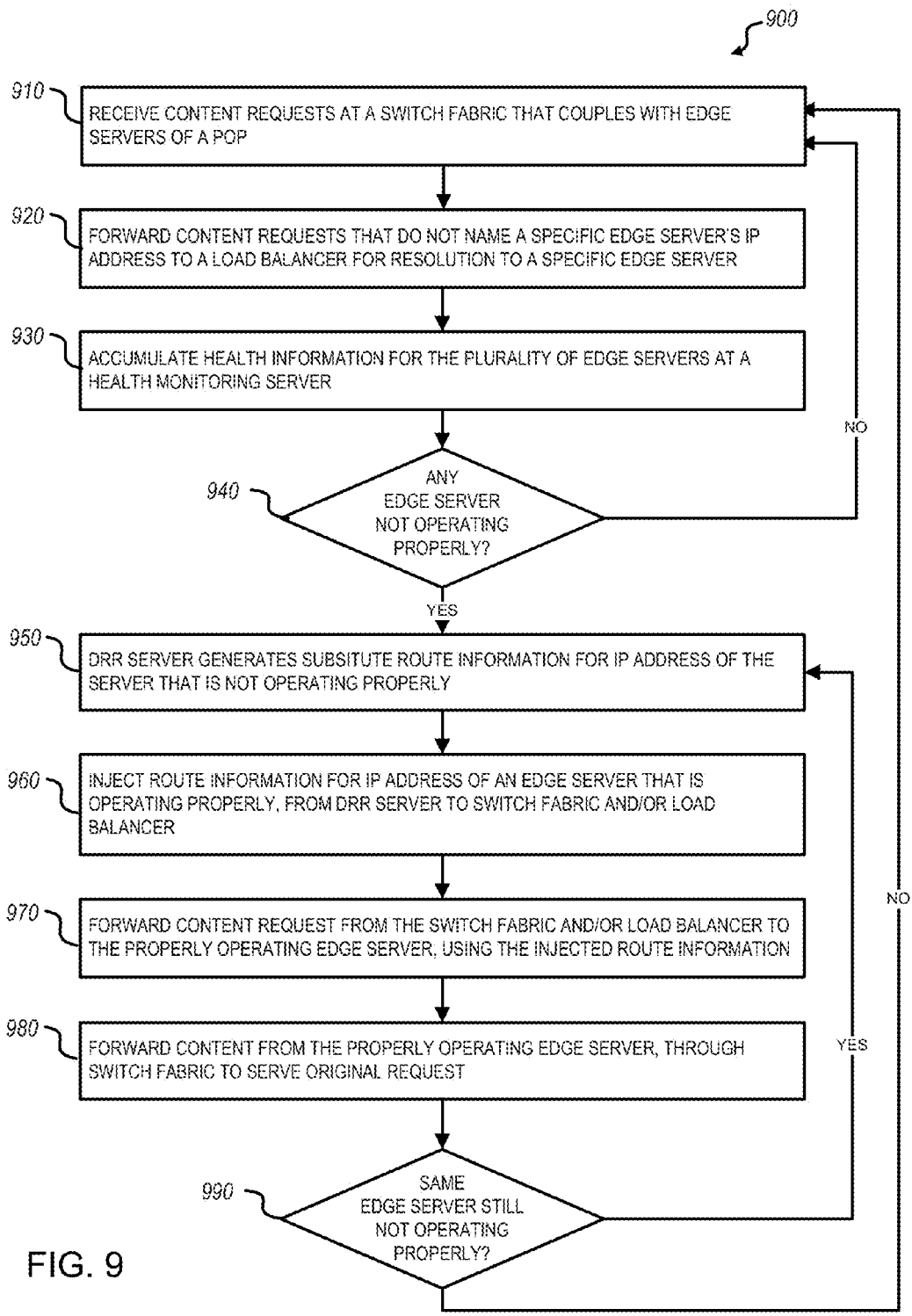
FIG. 9 is a flowchart of a method of dynamic request rerouting in a point of presence (POP) of a content delivery network, in accord with an embodiment.

FIG. 9 is a flowchart of a method 900 of dynamic request rerouting in a point of presence (POP) of a content delivery network. Method 900 operates on a POP that includes a dynamic request reroute (DRR) server 600 as discussed above in connection with FIGS. 6 and 7. Step 910 receives content requests at a switch fabric that can be served by a plurality of edge servers of the POP. Each of the edge servers is associated with an IP address. An example of step 910 is switch fabric 210 within POP 120-3 receiving a content request from end user system 124, FIG. 6. In step 920, the switch fabric forwards con ent requests that do not name a specific edge server's IP address to a load balancer for resolution to a specific edge server. An example of step 920 is switch fabric 210 forwarding a content request received from end user system 124 to load balancer 220, FIG. 6. Step 930 accumulates health information for the plurality of edge servers at a health monitoring server. An example of step 920 is health monitoring server 410 receiving health information from each of edge servers 350-1, 350-2, . . . 350-*n*, FIG. 6. Step 930 may be performed on an ongoing basis while content requests are being served, that is, it may be performed concurrently with steps 910, 920 and other steps of method 900.

Step 940 is a decision step that determines whether any of the edge servers are not operating properly. One example of step 940 is health monitoring server 410 making a determination that all edge servers 350-1, 350-2, . . . 350-*n* are operating properly, FIG. 6. Another example of step 940 is health monitoring server 410 making a determination that edge server 350-1 is not operating properly, FIG. 7. Also, as discussed above, the step 940 determination that all edge servers are operating properly or that one of them is operating improperly could be made by DRR server 600 based on information accumulated by health monitoring server 410, FIG. 6. If all of the edge servers are found to be operating properly, method 900 reverts to step 910 (and/or steps 920, 930 in parallel) to continue serving content requests. If any of the edge servers are found not to be operating properly, method 900 branches to step 950, in which the DRR server generates substitute route information to replace the IP address of the server that is not operating properly with an IP address of a server that is operating properly and can serve the content request. An example of step 950 is DRR server 600 generating substitute route information to replace the IP address of edge server 350-1, with the IP address of edge server 350-2, FIG. 7.

In step 960, the DRR server injects the route information generated in step 950, to a switch fabric and/or load balancer. An example of step 960 is DRR server 600 injecting the route information generated in step 950, to switch fabric 210 and/or load balancer 220, FIG. 7. Step 970 forwards a content request (e.g., from a user, received in step 910) from the switch fabric and/or load balancer to the properly operating edge server, using the injected route information from step 960. An example of step 970 is switch fabric 210 and/or load balancer 220, FIG. 7, forwarding a content request from end user system 124 to edge server 350-2. In step 980, content from the properly operating edge server is forwarded back through the switch fabric to serve the original request. An example of step 980 is edge server 350-2 forwarding content that fulfills the original request, back through switch fabric 210, FIG. 7, to serve the original request from end user system 124. Step 990 is a decision step that determines whether the same edge server found not to be operating properly in step 940, is now operating properly. An example of step 990 is health monitoring server 410 making a determination that all edge servers 350-1, 350-2, . . . 350-*n* are now operating properly, FIG. 6. Step 990 is optional, in the sense that it essentially repeats the determination made in step 940, so that content requests directed to the server that is not operating properly are rerouted continually while the server is down. Once the server that was not operating properly returns to normal operation, step 990 (or step 930) returns method 900 to step 910 to continue receiving content requests.

A number of variations and modifications of the disclosed embodiments will become evident to one skilled in the art upon reading and appreciating the present disclosure, and can also be used. For example, a health monitoring server and a DRR server as described herein may be implemented on separate items of computer hardware or may be implemented on the same item of computer hardware. Similarly, various combinations of any of the health monitoring server, the DRR server, a load balancer, a switch fabric, a switch/router and/or edge servers described herein may be implemented jointly or on separate items of computer hardware. Also, health information provided by edge servers to a health monitoring server, and/or status determinations by the health monitoring server, may include information that is more granular than a simple "up" or "down", for example a status determination may be that a specific part or mode of an edge server is not functioning, and a DRR server may take action based on the status determination that results in continuing to use the compromised edge server but to avoid the nonfunctioning parts or modes.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A point of presence for a content delivery network that supports dynamic request rerouting, comprising:
    a plurality of edge servers that store content objects, each of the edge servers being addressable through an IP address;
    a switch fabric that is operatively configured to receive content requests and forward each such request to an appropriate one of the edge servers, and when the request names a named one of the edge servers by its IP address, forwards the request to the named one of the edge servers;
    a load balancer that forwards the request to a selected one of the edge servers when the request does not name a named one of the edge servers by its IP address;
    a health monitoring server that gathers health information from each of the edge servers; and
    a dynamic request rerouting (DRR) server that receives the health information from the health monitoring server, such that upon the DRR server obtaining a status determination that one of the edge servers is not operating properly:
    the DRR server injects a route that includes the IP address of one of the edge servers that is operating properly, to at least one of the switch fabric and the load balancer,
    the at least one of the switch fabric and the load balancer forwards an original request for requested content that was originally addressed to the one of the edge servers that is not operating properly, to the one of the edge servers that is operating properly, using the route injected by the DRR server,
    the one of the edge servers that is operating properly responds by sending the requested content to the at least one of the load balancer and the switch fabric, and
    the at least one of the load balancer and the switch fabric responds to the original request with the requested content.

2. The point of presence for a content delivery network that supports dynamic request rerouting of claim 1, wherein the health monitoring server generates the status determination based on the health information from each of the edge servers, and forwards the status determination to the DRR server.

3. The point of presence for a content delivery network that supports dynamic request rerouting of claim 1, wherein the health monitoring server aggregates and forwards the health information to the DRR server without generating the status determination.

4. The point of presence for a content delivery network that supports dynamic request rerouting of claim 1 wherein the health information comprises one or more of native status information that is available from the edge servers, health check information that is available from the edge servers, and one or more measurements of response time to content requests.

5. The point of presence for a content delivery network that supports dynamic request rerouting of claim 1, wherein the DRR server comprises a health ingest layer that receives the health information, a routing rules layer that generates IP addresses to reroute traffic originally sent to the one of the edge servers that is not operating properly, and a route injection layer that injects the route that includes the IP address of one of the edge servers that is operating properly, to the at least one of the switch fabric and the load balancer.

6. The point of presence for a content delivery network that supports dynamic request rerouting of claim 1, wherein the health monitoring server, the DRR server and the switch fabric are configured to detect a server that is not operating properly, and to reconfigure the point of presence to implement a path to a working edge server, in five seconds or less.

7. A method of dynamic request rerouting in a point of presence for a content delivery network, comprising:
    receiving content requests at a switch fabric that operatively couples with a plurality of edge servers of the point of presence, each of the edge servers being associated with an IP address;
    forwarding ones of the content requests that do not name a specific edge server's IP address to a load balancer for resolution to a specific edge server;
    accumulating health information for the plurality of edge servers of the point of presence at a health monitoring server;
    determining from the health information that one of the edge servers is not operating properly;
    generating substitute route information, by a dynamic request reroute (DRR) server coupled with the health monitoring server, to replace the IP address of the edge server that is not operating properly with an IP address of an edge server that is operating properly and can serve a content request;
    injecting the substitute route information from the DRR server to at least one of the switch fabric and the load balancer;
    forwarding an original content request from the at least one of the switch fabric and the load balancer to the one of the plurality of edge servers that is operating properly, utilizing the injected substitute route information; and forwarding content from the one of the plurality of edge servers that is operating properly through the switch fabric to serve the original content request.

8. The method of dynamic request rerouting in a point of presence of a content delivery network of claim 7, wherein determining from the health information that one of the edge servers is not operating properly comprises generating, by the health monitoring server, a status determination based on the health information from each of the edge servers, and forwarding the status determination from the health monitoring server to the DRR server.

9. The method of dynamic request rerouting in a point of presence of a content delivery network of claim 7, wherein accumulating health information for the plurality of edge servers of the point of presence at the health monitoring server comprises aggregating and forwarding the health information from the health monitoring server to the DRR server without generating a status determination at the health monitoring server.

10. The method of dynamic request rerouting in a point of presence of a content delivery network of claim 7, wherein accumulating health information for the plurality of edge servers of the point of presence comprises accumulating one or more of native status information that is available from the edge servers, health check information that is available from the edge servers, and one or more measurements of response time to content requests.

11. The method of dynamic request rerouting in a point of presence of a content delivery network of claim 7, wherein the health monitoring server, the DRR server and the switch fabric cooperate to detect an edge server that is not operating properly, and to reconfigure the point of presence to implement a path to a working edge server, in five seconds or less.

12. The method of dynamic request rerouting in a point of presence of a content delivery network of claim 7, wherein:
    accumulating the health information for the plurality of edge servers comprises transmitting the health information to a health ingest layer of the DRR server;
    generating the substitute route information comprises generating the IP addresses of the edge server that is operating properly with a routing rules layer of the DRR server; and
    injecting the substitute route information from the DRR server to at least one of the switch fabric and the load balancer comprises injecting the substitute route information with a route injection layer of the DRR server.

13. A software product, comprising instructions stored on non-transitory, computer readable media, wherein the instructions, when executed by a computer, perform a method of dynamic request rerouting in a point of presence for a content delivery network, the instructions comprising:
    instructions for receiving content requests at a switch fabric that operatively couples with a plurality of edge servers of the point of presence, each of the edge servers being associated with an IP address;
    instructions for forwarding ones of the content requests that do not name a specific edge server's IP address to a load balancer for resolution to a specific edge server;
    instructions for accumulating health information for the plurality of edge servers of the point of presence at a health monitoring server;
    instructions for determining from the health information that one of the edge servers is not operating properly;
    instructions for generating substitute route information, by a dynamic request reroute (DRR) server coupled with the health monitoring server, to replace the IP address of the edge server that is not operating properly with an IP address of an edge server that is operating properly and can serve a content request;
    instructions for injecting the substitute route information from the DRR server to at least one of the switch fabric and the load balancer;
    instructions for forwarding an original content request from the at least one of the switch fabric and the load balancer to the one of the plurality of edge servers that is operating properly, utilizing the injected substitute route information; and
    instructions for forwarding content from the one of the plurality of edge servers that is operating properly through the switch fabric to serve the original content request.

14. The software product of claim 13, wherein the instructions for determining from the health information that one of the edge servers is not operating properly comprise instructions for generating, by the health monitoring server, a status determination based on the health information from each of the edge servers, and forwarding the status determination from the health monitoring server to the DRR server.

15. The software product of claim 13, wherein the instructions for accumulating health information for the plurality of edge servers of the point of presence at the health monitoring server comprise instructions for aggregating and forwarding the health information from the health monitoring server to the DRR server without generating a status determination at the health monitoring server.

16. The software product of claim 13, wherein the instructions for accumulating health information for the plurality of edge servers of the point of presence comprise instructions for accumulating one or more of native status information that is available from the edge servers, health check information that is available from the edge servers, and one or more measurements of response time to content requests.

17. The software product of claim 13, further comprising instructions for the health monitoring server, the DRR server and the switch fabric to cooperate to detect an edge server that is not operating properly, and to reconfigure the point of presence to implement a path to a working edge server, in five seconds or less.

18. The software product of claim 13, wherein:
    the instructions for accumulating the health information for the plurality of edge servers comprise instructions for transmitting the health information to a health ingest layer of the DRR server;
    the instructions for generating the substitute route information comprise instructions for generating the IP addresses of the edge server that is operating properly with a routing rules layer of the DRR server; and
    the instructions for injecting the substitute route information from the DRR server to at least one of the switch fabric and the load balancer comprise instructions for injecting the substitute route information with a route injection layer of the DRR server.

* * * * *

UNITED STATES PATENT AND TRADEMARK OFFICE
CERTIFICATE OF CORRECTION

PATENT NO. : 8,745,221 B1  
APPLICATION NO. : 14/030862  
DATED : June 3, 2014  
INVENTOR(S) : John Willbanks et al.

Page 1 of 1

It is certified that error appears in the above-identified patent and that said Letters Patent is hereby corrected as shown below:

In the Specification

Column 1, line 32, please delete "property" and insert --properly--.

Column 2, line 32, please delete "in" and insert --In--.

Column 3, line 15, please delete "frill" and insert --full--.

Column 3, line 19, please delete "seers" and insert --servers--.

Column 4, line 53, please delete "youttube" and insert --youtube--.

Column 5, line 22, please delete "IF" and insert --IP--.

Column 5, line 65, please delete "hut" and insert --but--.

Column 7, line 32, please delete "ail" and insert --all--.

Column 8, line 23, please delete "350-11" and insert --350-1--.

Column 8, line 5, please delete "fig. 59" and insert --figure 5b--.

Column 8, line 23, please delete "350-11" and insert --350-1--.

Column 8, line 27, please delete "2110" and insert --211--.

Column 10, line 26, please delete "property" and insert --properly--.

Column 11, line 8, please delete "conent" and insert --content--.

Column 13, line 5, please delete "content information" and insert --content. Information--.

Signed and Sealed this  
Ninth Day of December, 2014

Michelle K. Lee  
*Deputy Director of the United States Patent and Trademark Office*